Patented Oct. 26, 1948

2,452,506

UNITED STATES PATENT OFFICE 2,452,506

FOOD PREPARATIONS

Suzanne Mabel Lavinia Tritton,
Loughton, England

No Drawing. Application September 5, 1945, Serial No. 614,605. In Great Britain October 9, 1944

2 Claims. (Cl. 99—210)

This invention relates to improved food preparations and is more particularly concerned with the provision of an improved dehydrated egg preparation.

It has been found that although dehydrated egg powders are suitable for many purposes, difficulties arise when it is necessary to whip the egg powder in an aqueous medium, as is often the case in the manufacture of confectionery and bakery products including cakes.

It is an object of the present invention to provide a dehydrated egg preparation which will have improved whipping powers and also have certain other advantages hereinafter specified in the manufacture of food products particularly bakery and confectionery products.

With this object in view the present invention provides a dehydrated egg composition comprising dehydrated egg powder intimately mixed with a small proportion of pectin.

The pectin may be incorporated with the egg before, during or after the dehydration and in general a proportion of up to about 10%, for example 1 to 5%, by weight of the dehydrated egg powder will be sufficient, and even as little as 0.5% has an appreciable effect.

Thus, for example, 5% by weight of pectin may be mixed with an ordinary commercial dehydrated egg powder or a correspondingly smaller proportion with fresh egg which is afterwards dehydrated in known manner, for example by spray drying.

Since it is known that pectin tends to become lumpy when added to water or aqueous liquids and since this can be prevented by the addition of sugar, the pectin is preferably diluted with sugar before adding it to the egg. Approximately four times as much sugar as pectin is a convenient proportion.

If desired a little water may be added to the mixture of egg and pectin before drying in those cases in which the pectin is added to the egg before drying.

The following examples in which the parts are by weight illustrate how the process of the invention may be carried into effect:

1. One part of pectin was intimately mixed with 100 parts of whisked up fresh egg and the mixture dehydrated by spray drying.

2. A mixture of ½ part of pectin and 2 parts of sugar was intimately mixed with 100 parts of whisked up fresh egg and the mixture dehydrated in a hot chamber at 47° C.

3. A mixture of ¼ part of pectin and 1 part of sugar was intimately mixed with 100 parts of whisked up fresh egg and the mixture dehydrated by spray drying.

4. One part of pectin was intimately mixed with 100 parts of whisked up fresh egg and the mixture dehydrated in a hot chamber at 47° C.

5. Two parts of pectin was intimately mixed with 100 parts of dried egg powder.

It is thought that the addition of the pectin compensates for the slight denaturing of the albumin of the egg which occurs during dehydration.

When a composition according to the present invention is whipped with water or other aqueous liquid, the viscosity of the mixture is higher than in the case when the same dehydrated egg powder is whipped with the same proportion of water or other aqueous liquid without the addition of the pectin. Furthermore, the composition of the present invention when whipped with water or other aqueous liquid will hold air and moisture very satisfactorily so that when the preparation is used for the manufacture of cakes the flour is not toughened whilst cakes prepared with the composition of the present invention have a better bloom and remain moist for a longer period than a similar cake made with an ordinary dehydrated egg powder. Moreover a composition of the present invention mixed with water is more viscous than a similar composition containing the same proportion of dehydrated egg but without the addition of the pectin or a similar composition without the dehydrated egg powder but containing the same proportion of pectin.

I claim:

1. A process for the preparation of a dehydrated egg composition from undehydrated eggs for use in the baking and confectionery arts which comprises intimately admixing undehydrated eggs with an amount of pectin constituting from 0.5–10% based on the dehydrated weight of the eggs and dehydrating the resulting mixture to form a composition having an increased viscosity when whipped with an aqueous liquid as compared with conventional dehydrated egg compositions.

2. A process in accordance with claim 1, in which the pectin is intimately admixed with sugar in the proportion of one part of pectin to about four parts of sugar prior to mixing the pectin with the eggs.

SUZANNE MABEL LAVINIA TRITTON.

REFERENCES CITED

The following references are of record in the file of this patent:

UNITED STATES PATENTS

| Number | Name | Date |
|---|---|---|
| 1,795,980 | Wahl | Mar. 10, 1931 |
| 1,925,441 | Wilson et al. | Sept. 5, 1933 |
| 1,940,036 | Wilson et al. | Dec. 19, 1933 |
| 1,977,945 | Jameson et al. | Oct. 23, 1934 |
| 2,147,960 | Baier | Feb. 21, 1939 |